United States Patent
Whitney

[15] 3,654,503
[45] Apr. 4, 1972

[54] SYNCHRONOUS MOTORS WITH FIELD STARTING RESISTOR ARRANGEMENT

[72] Inventor: Eugene C. Whitney, Pittsburgh, Pa.
[73] Assignee: Westinghouse Electric Corporation, Pittsburgh, Pa.
[22] Filed: Sept. 24, 1970
[21] Appl. No.: 75,218

[52] U.S. Cl. ..............................310/162, 310/183, 310/184, 318/192
[51] Int. Cl. ........................................................H02k 19/00
[58] Field of Search..................310/162, 163, 164, 165, 177, 310/72, 207, 68, 269, 184, 261, 224, 266, 183, 185; 318/190, 192

[56] References Cited

UNITED STATES PATENTS

| 2,848,680 | 8/1958 | Maggs | 310/185 |
| 899,447 | 11/1906 | Field | 310/183 |
| 1,607,030 | 11/1926 | Weichsel | 310/162 |
| 1,614,092 | 1/1927 | Weichsel | 310/162 |
| 1,255,457 | 11/1914 | Murray | 310/183 |

Primary Examiner—J. D. Miller
Assistant Examiner—R. Skudy
Attorney—A. T. Stratton, F. P. Lyle and Gordon H. Telfer

[57] ABSTRACT

A synchronous motor is provided with starting resistors connected on each field coil or between pairs of field coils so as to confine the induced field current to only the portion of the field coils nearest the air gap. This results in less flux leakage and increases the contribution to pull-in torque of the field coils near synchronous speed so the machine can be brought into synchronism with a higher load torque than otherwise.

6 Claims, 4 Drawing Figures

Patented April 4, 1972
3,654,503
2 Sheets-Sheet 1
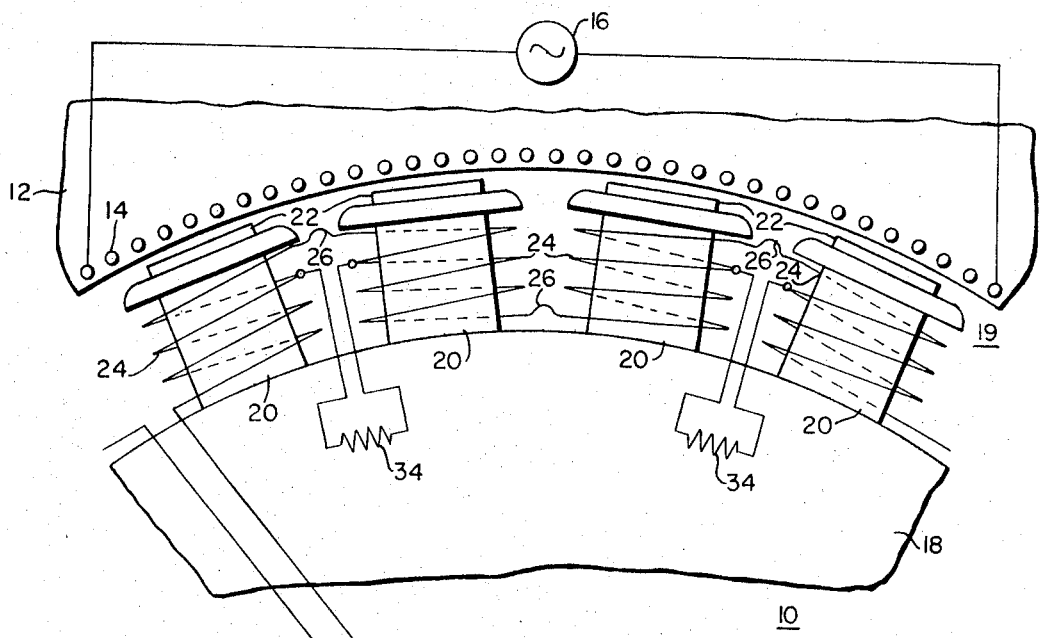
FIG. 1
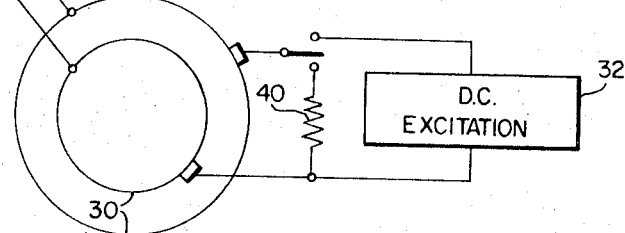
FIG. 2
WITNESSES
Alfred D. Colaizzi
James F. Young
INVENTOR
Eugene C. Whitney
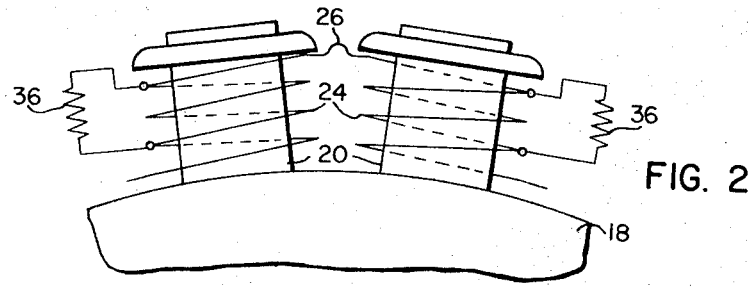
ATTORNEY

3,654,503

SYNCHRONOUS MOTORS WITH FIELD STARTING RESISTOR ARRANGEMENT

BACKGROUND OF THE INVENTION

1. Field of the Invention

This invention relates to synchronous motors and, more particularly, to such motors as are provided with field coil starting resistor arrangements.

2. Description of the Prior Art

Synchronous motors generally have a stator armature core and winding and a rotor with magnetic field poles around each of which is a field coil. The field coils are serially connected and the terminals thereof, usually made accessible by collector rings, permit application of DC excitation. Shorted damper bars or windings in the pole faces are provided for starting by induction motor action with the stator winding to which alternating voltage is applied.

The field coils are normally closed through a suitable resistance during starting and also provide inductive reaction upon the revolving field produced by the stator currents. The inductive effects produce torque sufficient to bring the motor and its load to within a few percent of the synchronous speed. If the speed attained under starting conditions is high enough, DC excitation can then be applied to the field and the machine will go to full synchronous speed.

The external resistance in the field circuit has been considered necessary to limit the induced voltage which would otherwise appear at the field terminals. After starting, this external resistance is disconnected from the field circuit. This commonly practiced starting method is generally successful. In some instances, however, for example with large synchronous motors such as those driving pumps, fans or other loads which cannot be reduced to a very low value, it would be desirable to have a means available for increasing the contribution of the field coil circuit to the torque of the machine near synchronous speed so as to permit starting with larger loads and attaining a greater percentage of the machine's pull-in torque before application of DC excitation.

SUMMARY OF THE INVENTION

This invention provides a means for increasing the torque contribution of the field circuit in starting a synchronous motor by providing a resistive connection between portions of the field coils in a manner that the induced field current during the starting period is confined substantially within a portion of the field coils nearest the rotor surface. There is thus provided improved coupling between the rotor and stator. There is less flux leakage because the flux is produced in a space closer to the stator.

The resistive connections may be made in different ways. For example, an individual resistor may be provided across a number of turns at the outside of each individual field coil or a resistive connection may be made between adjacent coils the effect of which is to limit the induced current as desired.

Only modest structural modifications are required by this invention compared with prior art machines. Suitably located taps on the coils for connection of the resistors are required as well as some means for securing the resistors to the rotor. The resistors may be permanently affixed in the field circuit. Means to switch out the resistors after the starting period could be provided if the cost were justified.

With the use of resistors in the field circuit in accordance with this invention, it is possible to leave the field or collector terminals open-circuited during the starting period. However, with the provision of higher resistance in the field circuit, an additional resistor could be used across the field terminals of higher value than is normally provided, or merely a small thermal capacity resistance to protect against abnormal field voltages.

While the purposes of this invention are primarily directed to improvement of torque contribution of the field circuit in starting, particularly at low slip, it will be recognized that the concept can be turned around. In any instance in which it is desired to increase the reactance of the rotor, suitable resistors in the field circuit may be provided to confine the induced field current during the starting period to the innermost turns thereof. Such an occasion might occur when starting geared loads to reduce the torque pulsations at half speed and where starting torques must be kept below a specified maximum.

BRIEF DESCRIPTION OF THE DRAWING

FIG. 1 is a partial view, largely schematic, of one embodiment of the present invention;

FIG. 2 is a partial view of an alternate embodiment of the invention;

DESCRIPTION OF PREFERRED EMBODIMENTS

Figure 3:
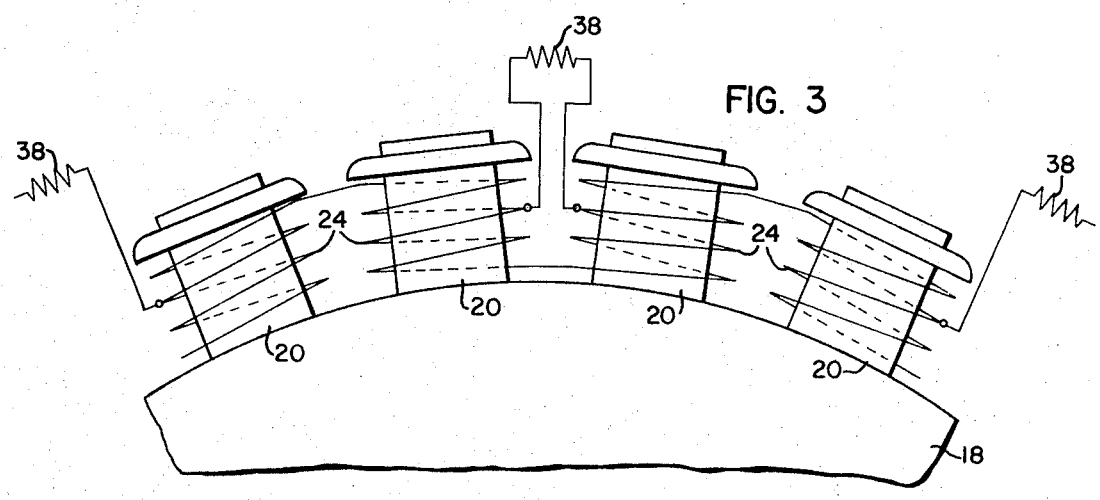
FIG. 3 is a partial view of a further alternate embodiment of the invention.

Referring to FIG. 1, there is shown a synchronous motor 10 with a stator core 12 and armature winding 14 to which is provided means for connection with an alternating voltage source 16. The motor has a rotor 18 within the stator 12 with an air gap 19 therebetween. The rotor 18 has a plurality of field poles 20 thereon. Damper windings 22 are provided on each of the poles 20 on a face thereof toward the stator 12. A field coil 24 is provided around each of the poles 20, each coil consisting of a plurality of stacked inductive turns. All the coils 24 are mutually interconnected in series by bridging conductors 26. Terminals 28 of the field coil circuit extend to means such as collector rings 30 for connection with external elements including a source 32 of DC excitation.

The machine elements are shown without considerable structural detail because the present invention may be applied to machines of prior construction with very little modification in terms of physical arrangement of elements. It will be understood, of course, that both the stator 12 and rotor 18 are substantially cylindrical elements including armature windings 14 and field poles 20 around their inner and outer circumferences, respectively.

The number of turns in each of the field coils 24 is determined by the excitation voltage supply and field excitation requirements of the motor. The number of turns in each coil 24 of the drawing for purposes of illustration is less than that normally employed in synchronous machines.

In the practice of the present invention, it is not required that any modification be made of the field coils 24 insofar as their function of carrying the DC excitation current is concerned. However, to avoid the induction of current throughout the entire field coil 24 during the starting period with attendant flux leakage because of the remoteness of the inner turns of the coil, by this invention there is provided resistive connection to the field coils effective to confine the induced field current to a number of turns close to the airgap.

In the embodiment of FIG. 1 the resistive connection is made between adjacent pairs of coils 24 by resistors 34 that are conductively connected to taps on certain turns of the coils allowing current to flow in each resistor 34 through the outer turns of the two adjacent coils.

FIG. 2 illustrates an alternate embodiment wherein an individual resistor 36 is provided across a portion of the turns of each field coil 24. The embodiment of FIG. 1 is preferred because it requires fewer elements.

FIG. 3 illustrates a further alternate embodiment but one which has a converse effect to those of FIGS. 1 and 2. Here, pairs of coils 24 have resistive interconnections 38 between them that limit induced current flow to a number of innermost turns of each of the field coils, hence increasing the reactance of the rotor. The concept of introduction with-in field coil circuits of resistive interconnections to modify the inductive reactance of the coils can thus be variously employed. Of primary interest are embodiments such as FIGS. 1 and 2 for reducing rotor reactance.

The exact position of the resistive interconnections influences the improvement in pull-in torque which can be obtained. The fewer turns adjacent the airgap 19 that are affected by the resistor 34 in FIG. 1 for example, the less flux leakage results. However, those fewer turns are required to carry more current because the quantity of ampere turns will remain nearly the same. In general, it is considered that substantial improvement in accordance with this invention can be achieved in instances in which the number of turns to which the induced field current is confined is less than half of the total number of turns. Problems of increased current during the starting period would not be considered detrimental, generally, if the number of affected turns were as little as about a tenth of the total number of turns. Therefore, for field windings consisting of approximately 40 turns of copper, it is generally suitable in accordance with this invention to make the resistive connections in the manner of FIGS. 1 and 2 to leave remaining below the resistors a number of turns from about four to about 20.

Uniformity of the number of turns affected on each of the field coils is highly desirable although not essential to the practice of the invention. In general, it is desirable to provide a uniform distribution to provide uniform forces acting between rotor and stator on various poles during the starting period.

The magnitude of the resistance in the resistive interconnection bears some consideration although those skilled in the art will experience no difficulty in selecting suitable values. To have the desired effect on the induced field current, it is necessary that this interconnection have a greater resistance than the otherwise present current path through the turns of the coils between the same two taps. A higher resistance is desirable to cause a more favorable speed-torque characteristic as will be subsequently explained in connection with FIG. 4. A consideration on the maximum value of the resistors is whether the field coil terminals 30 will be left open-circuited or not. If left open-circuited, excessive voltage build up across those terminals has to be avoided because of high voltage between collector rings and/or inadequate circuit breakers for high voltage such as above 2,500 volts. However, if it is desired to employ a resistor 40 across the field terminals, as shown in FIG. 1, it will permit higher valued resistors to be used in the resistive interconnections between the coils. The resistance magnitude should be made suitable for the particular application. If a suitable trimming resistor 40 is employed, the total resistance among the field coils may be greater. For example, in the case of 80,000 horsepower synchronous motors, having twelve poles of 43-½ turns on each with resistive interconnections in accordance with FIG. 1 made 15 turns down from the outside, satisfactory performance, including the avoidance of excessive voltage at the field terminals, can be provided using resistors between the field coils of about 0.07 ohms each while using a trimming resistance of about 4 ohms.

Figure 4:
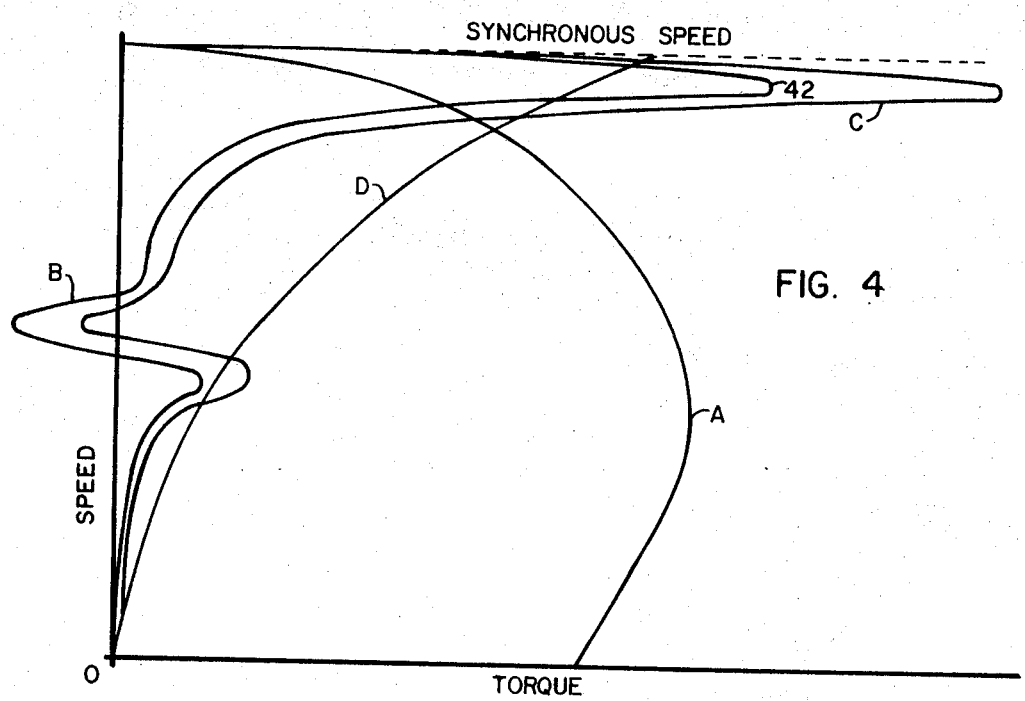
FIG. 4 is a set of characteristic curves of speed versus torque for purposes of discussing the operation of the present invention.

Referring now to FIG. 4, a further explanation of the invention will be given in connection with a speed-torque characteristic curve wherein speed and torque are presented on the vertical and horizontal axis, respectively, in arbitrary units. A first curve A shows the contribution to torque with increasing speed of the damper windings 22, such torque being initially substantial but diminishing when the speed approaches synchronous or full speed. A second curve B illustrates the contribution to torque of the field coils where the arrangement in accordance with this invention is not employed. Characteristically this curve increases from minimal torque, has some anomalous cusps at about half speed, which are tolerable if the damper windings provide sufficient torque, and then increases to a peak 42 that is very near synchronous speed. This peak 42 may be quite narrow and typically on bigger machines is in the range of about 0.2 percent to 2 percent slip or difference from synchronous speed. The machine as a whole sees only the torque combined from both dampers and field coils, i.e., the sum of curves A and B. On a third curve C there is shown a modified speed-torque characteristic for the field coil contribution in embodiments in accordance with this invention. This results in somewhat greater total torque but more importantly perhaps, is that the peak torque of the curve near synchronous speed is increased so as to cover a greater load as evidenced by the load curve D. In accordance with this invention, the total torque provided is increased in relation to the pull-in torque which is the maximum at which a machine may be brought into synchronism. Calculations with respect to an embodiment as described above indicate an increase of total torque of from about 75 percent of rated torque to about 83 percent of rated torque.

The trimming resistor 40 provides a means for adjusting the slip at which the peak of the field torque occurs (curve C). For example, use of the field coils and resistors 34 without the trimming resistor 40 may produce maximum field torque at a slip of some fairly substantial size, say 8 percent. With the machine at maximum field torque under those conditions, a trimming resistor 40 of suitable magnitude can, if desired, be introduced into the circuit to adjust the slip to a smaller amount, say 3 percent; some moderate reduction in the field coil maximum torque contribution may also result. The selective use of the trimming resistor thus offers a way to optimize the location of the peak of curve C and the intersection of curves C and A.

I claim:

1. A synchronous dynamoelectric machine comprising: inductively related machine elements including a stator and a rotor; a first of said machine elements having an armature winding thereon; a second of said machine elements having a plurality of field poles thereon each having a face toward said first machine element, a damper winding on each of said poles on said face and a field coil around each of said poles, said field coils being mutually interconnected and each comprising a plurality of radially stacked turns; and resistive means connected with said field coils to limit the number of said turns in which induced field current flows when said machine is started.

2. The subject matter of claim 1 wherein: said resistive means comprises a plurality of resistor elements each connected between an adjacent pair of said field coils.

3. The subject matter of claim 1 wherein: said resistive means comprises, on each of said field coils, a single resistor element connected across a number of turns thereof.

4. The subject matter of claim 2 wherein said resistor elements are connected to said filled coils for increasing motor starting torque by limiting said turns in which induced field current flows when said machine is started to a number of turns nearest said first machine element.

5. The subject matter of claim 2 wherein: said resistor elements are connected to said field coils for decreasing motor starting torque by limiting said turns in which induced field current flows when said machine is started to a number of turns farthest from said first machine element.

6. The subject matter of claim 4 wherein: said first machine element is said stator, said second machine element is said rotor and is positioned within said stator; said field coils are serially interconnected; and said resistor elements are individually connected between an adjacent pair of said field coils that are mutually interconnected between their respective turns that are nearest said other machine element.

* * * * *